US007969302B2

(12) United States Patent
Srinivasa et al.

(10) Patent No.: US 7,969,302 B2

(45) Date of Patent: Jun. 28, 2011

(54) SYSTEM AND METHOD FOR DYNAMIC ASSOCIATION OF SECURITY LEVELS AND ENFORCEMENT OF PHYSICAL SECURITY PROCEDURES

(75) Inventors: Srinath Malur Srinivasa, Bangalore (IN); Venkatesh Viswanathan, Karnataka (IN); Vinay Venkatesh, Bangalore (IN)

(73) Assignee: Honeywell International Inc., Morristown, NJ (US)

( * ) Notice: Subject to any disclaimer, the term of this patent is extended or adjusted under 35 U.S.C. 154(b) by 394 days.

(21) Appl. No.: 12/135,630

(22) Filed: Jun. 9, 2008

(65) Prior Publication Data

US 2009/0303040 A1 Dec. 10, 2009

(51) Int. Cl.
*G08B 13/00* (2006.01)
*G05B 23/02* (2006.01)

(52) U.S. Cl. ........................................ 340/541; 340/3.1

(58) Field of Classification Search .................. 340/571, 340/5.2, 5.21, 546, 545, 547, 568.1, 572.1–572.9, 340/540, 541, 3.1, 3.6, 3.9, 573.1, 5.8
See application file for complete search history.

(56) References Cited

U.S. PATENT DOCUMENTS

| | | | | |
|---|---|---|---|---|
| 6,189,105 | B1 * | 2/2001 | Lopes | 726/20 |
| 7,212,097 | B2 * | 5/2007 | Yoshikawa et al. | 340/5.28 |
| 7,437,765 | B2 * | 10/2008 | Elms et al. | 726/26 |
| 7,439,847 | B2 * | 10/2008 | Pederson | 340/5.81 |
| 7,539,489 | B1 * | 5/2009 | Alexander | 455/423 |
| 7,591,020 | B2 * | 9/2009 | Kammer et al. | 726/26 |
| 7,636,842 | B2 * | 12/2009 | Kumoluyi et al. | 713/166 |
| 7,671,718 | B2 * | 3/2010 | Turner et al. | 340/5.61 |
| 2006/0059365 | A1 * | 3/2006 | Harper | 713/186 |
| 2007/0008142 | A1 * | 1/2007 | Crowe et al. | 340/572.8 |
| 2007/0078782 | A1 * | 4/2007 | Ono et al. | 705/67 |
| 2009/0085743 | A1 * | 4/2009 | Ravi et al. | 340/572.1 |

* cited by examiner

*Primary Examiner* — Jennifer Mehmood
(74) *Attorney, Agent, or Firm* — Husch Blackwell

(57) ABSTRACT

A method and system for dynamic association of security levels and enforcement of security procedures. A secure object can be tracked across a building or complex, and security levels may be dynamically updated to reflect the new security requirement. In response to the security level adjustment, security measures and protocols may be implemented dynamically. The system comprises a sensitivity index assigned to each of a plurality of secure objects, a scanner for detecting the sensitivity index, and a logic unit in communication with the scanner for determining a security level for the secure area based on the sensitivity indices of the plurality of secure objects within the secure area. The method comprises detecting a plurality of secure objects within a secure area, each secure object having a sensitivity index, and determining a security level for the secure area based on the sensitivity indices of the plurality of secure objects within the secure area.

20 Claims, 2 Drawing Sheets

SYSTEM AND METHOD FOR DYNAMIC ASSOCIATION OF SECURITY LEVELS AND ENFORCEMENT OF PHYSICAL SECURITY PROCEDURES

BACKGROUND OF THE INVENTION

1. Field of the Invention

The present invention relates generally to security alarm and building automation systems. Specifically, the present invention relates to dynamic adjustment of security levels and procedures.

2. Background of the Invention

Security and building automation systems are more in use today than ever before. Improvements in communication technology make it easier to install an alarm or theft-detection system that reports events to a central monitoring station in real-time. In particular, network technology allows alarm-reporting equipment to report events using a ubiquitous packet-based network such as the Internet. Further, with the advent of cellular technology, alarms may be reported to a central monitoring station via a standard cellular network such as a 3G network.

In modern security systems, the central monitoring station, or a local security control panel, also provides access to a plurality of security resources, including but not limited to surveillance, access control, and other options. These resources may be allocated by an operator of the security system. Various factors affect the allocation, such as the determination that certain secure areas need to be protected more than other secure areas. This is important in environments where valuable objects (also called secure objects) are regularly transported to different secure areas within a building or complex.

Currently, the allocation process for security measures and distribution of resources is manual and cumbersome. Furthermore, there is a lack of information regarding which secure objects are in which secure area. For instance, a valuable painting in a museum may be transported to a storage room while the exhibit room is being cleaned. The storage room lacks the appropriate security surveillance and access control. An operator would have to be aware of the fact that the painting is in the storage room, and would further have to manually route additional security parameters to take effect in the storage room; such as increased guard patrol or restricted access to key personnel. This is also applicable to the movement of important people. Access control for new areas to which the people have moved needs to be re-adjusted to accommodate the new security level requirement for the secure area.

Correspondingly, security measures and procedures associated with the new security level are not enforced due to the static association of the security level to the secure area, and the lack of real-time information regarding the desired security level. What is needed is a system and method for improved dynamic association of security levels and enforcement of security procedures.

SUMMARY OF THE INVENTION

The present invention overcomes the above problems by providing a method and system for dynamic association of security levels and enforcement of security procedures. A secure object can be tracked across a building or complex, and security levels may be dynamically updated to reflect the new security requirement. In response to the security level adjustment, security measures and protocols may be implemented dynamically.

In one embodiment, the present invention is a system for dynamically providing security measures, the system comprising a sensitivity index assigned to each of a plurality of secure objects, a scanner for detecting the sensitivity index of each of the plurality of secure objects within a secure area, and a first logic unit in communication with the scanner for determining a security level for the secure area based on the sensitivity indices of the plurality of secure objects within the secure area. The system further comprises an indicator coupled to each of the plurality of secure objects, said indicator being scannable by the scanner and being associated with the sensitivity index for said each of the plurality of secure objects. The indicator may comprise the sensitivity index of a secure object, or the indicator may simply point to a record in a first database coupled to the first logic unit, the database containing a record for each of the plurality of secure objects, the record further including the sensitivity index for each secure object. In such a case, the indicator comprises a unique ID for the secure object, and the first logic unit receives the unique ID from the scanner and retrieves the record corresponding to the secure object to determine the sensitivity index of the secure object.

The scanner may be a radiofrequency, optical, or magnetic scanner. The system of claim 6, wherein the indicator is an RFID tag, barcode, or magnetic strip.

The system may further comprise a plurality of security parameters stored on a second database, wherein each security parameter corresponds to a security level of the secure area. A second logic unit coupled to the second database activates a security parameter corresponding to the security level of the secure area, both second logic unit and second database being coupled to the first logic unit. The second logic unit may be a part of a central monitoring station. The plurality of security parameters further comprises any combination of the following parameters: access, surveillance, and system resources.

In another embodiment, the present invention is a method for dynamically providing security measures, the method comprising: detecting a plurality of secure objects within a secure area, each secure object having a sensitivity index, and determining a security level for the secure area based on the sensitivity indices of the plurality of secure objects within the secure area. The method further comprises coupling an indicator to each of the plurality of secure objects, said indicator being scannable by the scanner and being associated with the sensitivity index for said each of the plurality of secure objects. The sensitivity index of the secure object may be retrieved directly from the indicator. Alternatively, the method further comprises scanning the indicator coupled to a secure object, and referring to a first database coupled to the first logic unit to retrieve a record for the secure object, the record further including the sensitivity index for the secure object.

The scanner may be a radiofrequency, optical, or magnetic scanner, wherein the indicator is respectively a RFID tag, barcode, or magnetic strip. The method further comprises communicating the security level for the secure area to a second logic unit, and activating a plurality of security parameters for the secure area corresponding to the security level for the secure area. A second database may be referred to, said second database containing records for each secure area, the records comprising security parameters corresponding to each security level for said each security area. The security parameters further comprise any combination of the following parameters: access, surveillance, and system resources. The security level for the secure area is updated in real time.

DETAILED DESCRIPTION OF THE INVENTION

Figure 1:
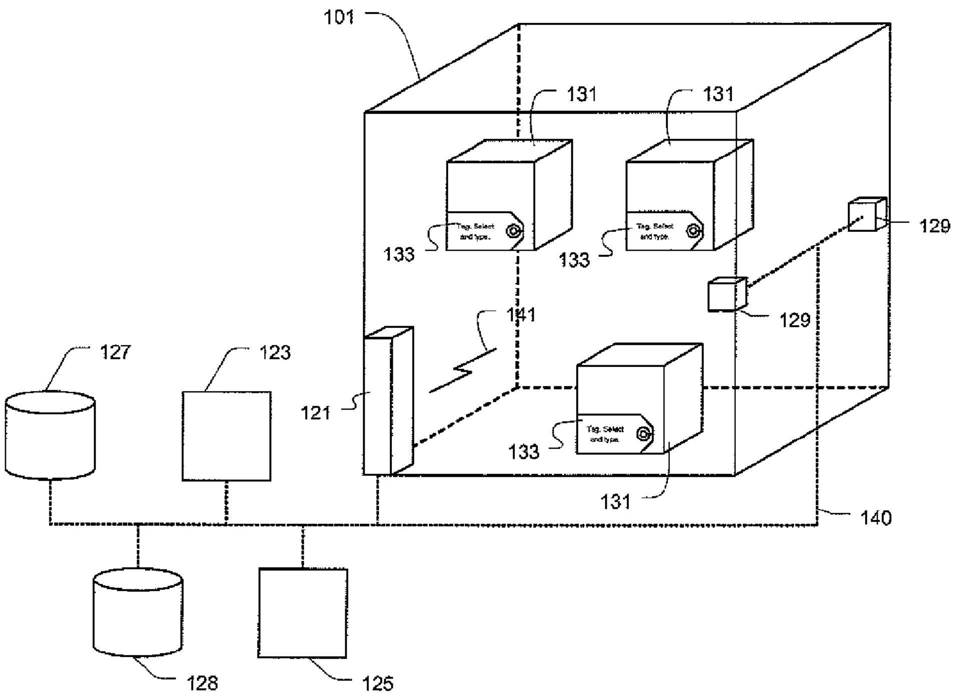
FIG. 1 shows a plurality of secure objects within a secure area according to an exemplary embodiment of the present invention

FIG. 1 shows a plurality of secure objects within a secure area, according to an exemplary embodiment of the present invention. Secure area 101 is a room or enclosure, or any range within which secure objects 131 having indicators 133 can be detected by scanner 121. Secure area 101 is monitored by security monitors 129. Scanner 121, logic units 123 and 125, databases 127 and 128, and security monitors 129 are linked by the dotted line 140, representing communication between these elements. Communication link 141 represents wireless communication between scanner 121 and indicators 133 on secure objects 131.

Secure area 101 can be any physical area in which a valuable object, such as secure object 131, is stored, housed, or displayed. A secure area may have an entrance such as a door or window. For the purposes of the present invention, a secure area may be any area that encompasses the range of a scanner 121. If a plurality of scanners is used, then a secure area is the area within the cumulative range of all the scanners. Some examples of secure areas include offices, exhibit and storage rooms in museums, places with high-tech valuables such as hospitals, research laboratories, and so on. A secure area may even house a human secure object, such as a prison housing a dangerous criminal, or a government building housing a top-level official.

A secure area is one in which a secure object is to be stored. A secure object is any object that has some value, and thus needs to be monitored and protected. In the case of a museum, a secure object may be a valuable painting or antique. In an office, a secure object may be a computer server, a laptop, an original document, etc. In a prison, a secure object is a prisoner. Other examples will be evident. Every secure object is assigned a sensitivity index. The sensitivity index reflects the value of the object on a sliding scale, for instance, 1-100 with 100 being extremely valuable and 1 having very little relatively value. The sensitivity index does not have to reflect the monetary value of the object; for instance the value of a top-government official is indeterminable in numbers but can still be assigned a high sensitivity index. Thus, the sensitivity index reflects the level of protection that the secure object requires.

When a secure object enters or is brought into the secure area, scanner 121 detects the presence of the object. Scanner 121 can use any method known in the art to detect secure object 131. For instance, secure object 131 may have attached to it an indicator, such as a bar code or similar optical indicator. The scanner 121 would thus be an optical scanner. In another embodiment, the indicator 133 is a radio-frequency identification (RFID) tag attached to thin secure object 131. Scanner 121 is then a RFID scanner. The indicator 133 may be a magnetic tag detectable by a magnetic scanner. The scanner may even be an optical scanner such as a video camera with recognition capabilities, thus being able to recognize unique objects without the need of tags. For instance, a prison security camera may be programmed to recognize facial features of certain prisoners. The camera then becomes the scanner, the secure area is the area covered by the range of the camera, the prisoner is the secure object, and the prisoner's unique features allowing recognition become the indicator.

Accordingly, scanner 121 may be used to identify a secure object 131 within secure area 101, wherein each secure object 131 has a sensitivity index. The sensitivity indices of each secure object 131 within secure area 101 provide a measure of how secure the secure area 101 needs to be. This can correspond to a security level for the security area. In one embodiment, the security level for the secure area is simply the sum of the sensitivity indices of the secure objects within the secure area. Alternatively, a scaled set of security levels may be used with 1 being the lowest and 10 being the highest. Other alternatives will be apparent.

The identifier 133 of each secure object 131 can be used to determine the sensitivity index of the secure object, and thus the security level for the secure area. As mentioned herein, the indicator may be an optical, RF, or magnetic tag, or simply a unique identifying characteristic of the secure object itself, such as a human face. In one embodiment, the indicator itself contains the sensitivity index of the secure object. For instance, a bar code may be code could contain the sensitivity index for the secure object. An optics scanner would scan the object as or when the object enters the secure area, and sends this information to logic unit 123. Logic unit 123 would then update the security level of the secure area to reflect the presence of the secure object. In an alternative embodiment, the indicator may simply be a unique identifier for the secure object. In this case, scanner 121 is in communication with, inter alia, logic unit 123 and database 127. A record for each secure object is stored in database 127. Each record further includes the sensitivity index of the object. Using existing means, logic unit 123 may receive scanned identification information of the secure object from scanner 121, and retrieve the corresponding record from database 127 to get the sensitivity index of the secure object. Thus, the indicator links the secure object to it's corresponding record in database 127.

Logic unit 123 may be housed within a computer server stored locally or remotely in communication with scanner 121. The dotted line represents this communication. These elements may communicate over a local or wide area network that may be either fixed or mobile or a combination thereof. In one embodiment, logic unit 123 and database 127 are local, and logic unit 125 and database 128 are remote. Logic unit 123 and database 127 work in conjunction with the information scanned by scanner 121 to determine the total sensitivity index of all secure objects in secure area 101, and potentially to determine a security level for secure area 101. This information may be communicated to logic unit 125. Logic unit 125 is part of a security system control panel, or alternatively may be part of a central monitoring station. The security system control panel is local, and is used by local operators to set security parameters within the building or complex that encompasses secure area 101. On the other hand, a central monitoring station may be in a remote location relative to secure area 101. Either the control panel or the central monitoring station comprises a plurality of servers and databases that contain security policies and parameters that define the behavior of security monitors 129.

Accordingly, in one embodiment of the present invention, the security level of the secure area is used to enact security measures appropriate to the security level. Many valuable objects within a single secure area would generate a high overall sensitivity index, and therefore a higher security level. The high security level indicates to the security system that additional security measures need to be adopted to protect the secure objects within the security area.

The actual implementation of additional security measures varies on a case-by-case basis, depending on the security monitors available to the user. Surveillance is an integral part of most security systems. Thus, a change in the security level of the secure area can dynamically trigger a change in the surveillance parameters of the secure area. Introducing a valuable secure object into the secure area triggers an update in the security level of the secure area, thereby increasing surveillance of the area. This increase can take many forms. For instance, a motion-enabled security camera within the secure area may have a default sweep frequency, i.e. 5 sweeps per minute. Increasing this sweep frequency to 10 sweeps per minute provides more video footage of each part of the secure area more often. Although this increases the resources on the system, possibly using more electric power, processing power, storage space, wear and tear, etc., the user is able to configure the system to the point that reduces the risk of losing track of a valuable object, thus maximizing the overall value of the system.

Access parameters may also be modified to reflect the security level of the secure area. Access parameters include, inter alia, restricting access to limited personnel. For instance, a storage unit in a museum may be equipped with the system described herein. A valuable painting recently acquired by the museum is assigned a sensitivity index close to the top of the scale, and is brought into the storage area for storage until an appropriate display location is determined. The system detects the presence of the painting (represented by one of secure objects 131), scans an indicator depending on the scanning mechanism used, and updates the security level of the storage area. The updated security level automatically triggers an increase in the security measures adopted to restrict access to the service area. If museum employees are equipped with tags determining their employee level, said tags allowing access via certain doors in the building, the tag sensor at the door of the storage area may be automatically programmed to restrict access to only the highest level employees of the museum. When the valuable painting is taken out of the storage room, the security level of the storage room automatically drops back to normal (or whatever security level reflects the remainder of secure objects in the storage room) and the access parameters are dynamically updated to allow access to lower-level employees.

Referring back to FIG. 1, the above functionality is implemented by providing a communications link (dotted line 140) between logic units 123 and 125. Logic unit 125, which is part of a security control panel or central monitoring station, is able to control the behavior of security monitors 129. Access level, surveillance, and other security parameters may be stored in database 128. When a secure object 131 is placed in the secure area 101, the logic unit retrieves the corresponding record in database 127, and calculates the new security level for the storage area 101. The new security level is transmitted to logic unit 125. Logic unit 125 refers to database 128 to retrieve the security parameters that correspond to said security level for secure area 101. Logic unit 125, or one of a plurality of logic units within the control panel or central monitoring station then communicate the new parameters to security monitors 129. Security monitors 129 update their behavior to correspond to the new parameters.

Security monitors 129 may comprise any of the plurality of security measures described herein. Security monitors 129 may include CCTV cameras, noise sensors, motion sensors, and related surveillance monitors. Security monitors 129 may further comprise access card/tag readers, door/window locks, and related access level control means. In one embodiment, security monitors 129 include security guards who receive communications from a central monitoring station, the communications involving a change in patrol frequency, density, and other related practices.

Figure 2A:
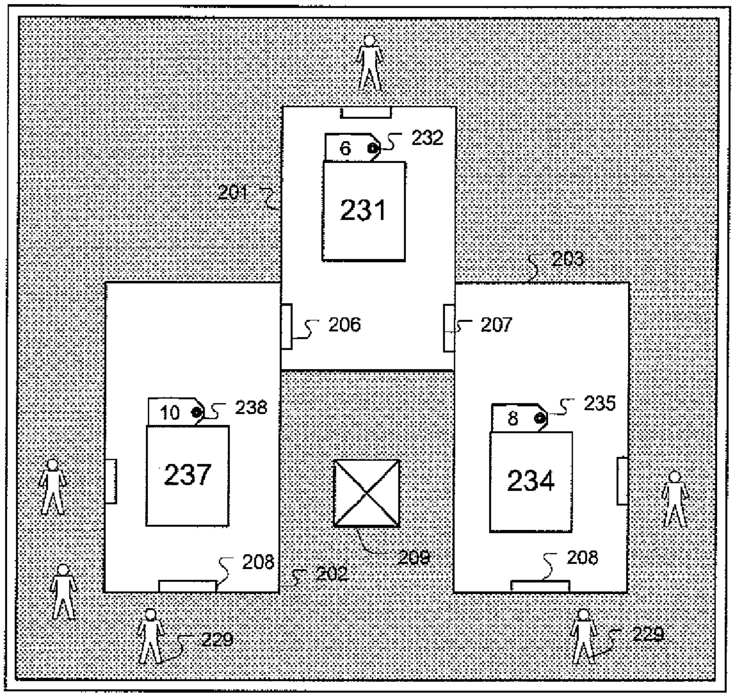
FIGS. 2A, 2B and 2C show an exemplary implementation of the present invention is shown in the context of a museum.
Figure 2B:
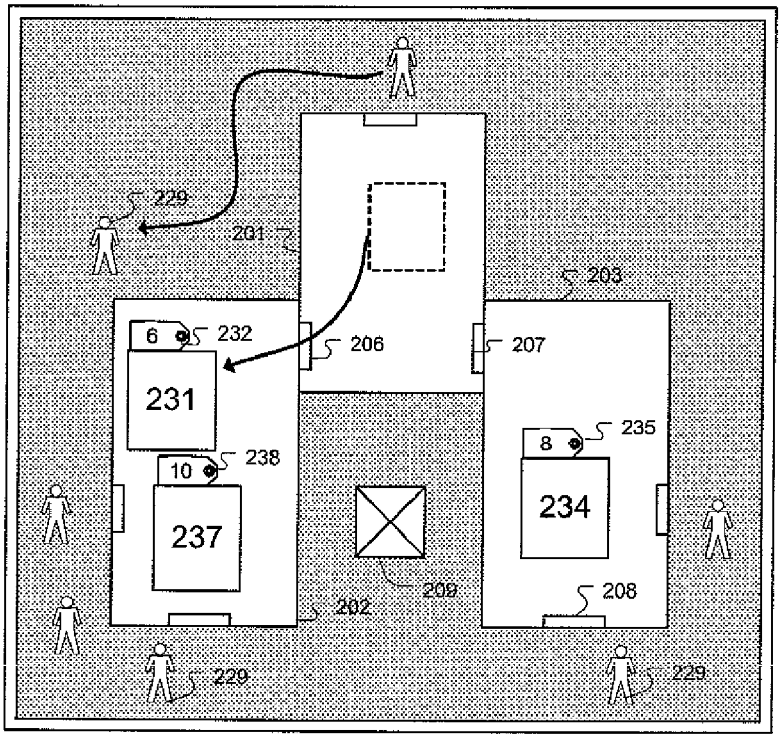
Figure 2C:
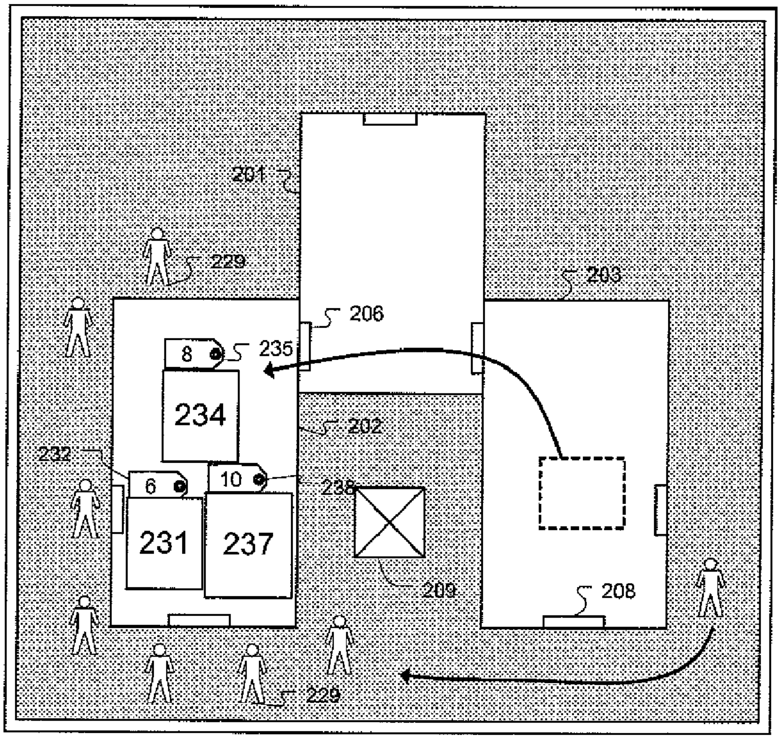

Referring now to FIGS. 2A, 2B, and 2C, an exemplary implementation of the present invention is shown in the context of a museum. FIGS. 2A-2C show how security resources may be dynamically distributed to areas that have the highest security levels, wherein the security level is based on the cumulative sensitivity index of the secure objects in the area. For the purposes of the present disclosure, the museum is a simple structure consisting of three exhibition rooms 201, 202, and 203, each of which is a separate secure area having door entrances 206 and 207 and windows 208. Each secure area 201-203 is further equipped with one or more scanners, and potentially cameras and other surveillance and access control equipment (not shown). Security guards 229 patrol the outer perimeters of the secure areas 201-203.

There are three valuable paintings in the museum: 231, 234, and 237. Painting 231 is valued relatively lower than painting 234, which in turn is valued relatively lower than painting 237, the most valuable of the three. Each painting has assigned to it a sensitivity index based on the relative value of the painting. As described above, an identifier may be used to communicate this sensitivity index, or the identifier may be used to identify the painting and retrieve the corresponding sensitivity index from a database. The scanner may even recognize the painting optically, using any recognition method known in the art. For the purposes of the present embodiment, each painting 231, 234, 237 has a corresponding indicator 232, 235, 238 that reflects the sensitivity index of the painting on a scale of 1 to 10, 10 being the highest. That is, each indicator 232, 234, 237 contains sensitivity index information that is readable by a scanner present in each secure area. Painting 231 has a sensitivity index of 6, painting 234 has a sensitivity index of 8, and the painting 237 has a sensitivity index of 10.

Referring to FIG. 2A, painting 237 is displayed in area 201, painting 231 is displayed in area 202, and painting 234 is displayed in area 203. We can assume for the purposes of the present embodiment that the security level of each area 201-203 is the cumulative sensitivity index of the secure objects within that area. In other words, given the distribution in FIG. 2A, secure area 201 has a security level of 10, area 202 has a security level of 6, and area 203 has a security level of 8. Further, security guards 229 are provided in larger numbers around secure areas with higher security levels. Alternatively, the patrol frequency is increased for higher security levels. The general idea is that greater security resources/measures are directed towards areas of higher sensitivity. Thus, the exterior of area 201 housing Mona Lisa 237 is patrolled by three security guards 229, area 202 housing The Scream 231 is patrolled by one security guard 229, and area 203 housing Starry Nights 234 is patrolled by two security guards 229.

This arrangement is merely a snapshot at a particular time and can vary dynamically and in real-time based on the location of the paintings. Referring now to FIG. 2B, it is seen that painting 231 has been relocated to secure area 201. When this happens, the scanner in room 202 does not detect painting 231 within its vicinity any more, and correspondingly the security level of room 202 is lowered. Almost instantly, the scanner in room 201 detects an additional secure object entering the room, and the system correspondingly raises the security level of room 202 to a number that reflects the new cumulative sensitivity index; in this case the security level is raised to 16.

A central monitoring station or alarm control panel is notified that the security level of room 202 is lowered and the security level of room 201 is raised. Instantly, a logic unit checks a database to retrieve the security parameters that correspond to the new security level. Every secure area may have a record on the database that provides security parameters for a range of security levels. Thus, the record for room 202 may indicate that if the security level drops to zero, no guards 229 are needed. At the same time, the record for room 201 indicates that if the security level is raised by 6 points, an additional patrol or security guard 229 is needed. The central monitoring station or control panel appropriately redistributes security resources to patrol the perimeter of room 201. In FIG. 2B, this is indicated by the movement of one of the security guards 229 bringing the guard closer to room 201. This may be achieved by informing a dispatcher with an instruction to radio the security guard 229 with his new position. Alternatively, the guard 229 may himself be provided with a location map via a mobile device pointing him to his new assignment. Other methods will be known.

In FIG. 2C, painting 234 is removed from area 203 and placed in area 201, so that all paintings are in the same area. In this case, the process is the same as described in the previous paragraph. i.e., the sensor in area 203 stops detecting painting 234 and the security level of the room is correspondingly lowered. However, before reaching area 201, the painting traverses area 202. It is conceivable that at this point area 202 detects the presence of the painting and its' security level is thereby increased. Two arrows are shown indicating the motion of the guard 229 from his original spot. In one embodiment, the frequency of updating the security parameters is quite high, so that updated security measures are enacted instantly when notification of a change in security level is received. For the present purposes, however, painting 234 is in room 202 for a very short transitory period of time. Since the eventual destination is room 201, the guard 229 need not walk all the way around to room 202 and then 201. By adding a slight time delay at any point in the process, unnecessary reconfigurations of security may be avoided. For instance, the logic unit coupled to the scanner may be programmed to wait a period of a few hours before updating the security level of the secure area. The update may therefore not be in real-time, but close enough to provide appropriate security measures where needed without unnecessary reshuffling of security personnel and resources.

Further, although FIGS. 2A, 2B and 2C show security personnel being dynamically allocated based on security levels, other security parameters can be invoked. For instance, door entrances 206 and 207 may be equipped with access control means by which certain employees are authorized entry based on possession of a tag, or equivalent. An increased security level for a security area may trigger an instruction to be sent to the access control mechanism to limit access to certain high-level personnel. Similarly, windows that are usually open for ventilation can be shut by automated means when a security level is updated. In addition, the operation of monitoring apparatus such as cameras and sensors may be modified based on changes in the security level. All these parameters and more can be stored in the database and associated with the security level for the specific secure area. Further, multiple different security parameters can be invoked in real time or with preset time delays when notification of a change in security level is received by the scanner and associated logic unit.

Finally, multiple applications for the described system and method will be apparent. Hospitals, research establishments, and other places where high-value test equipment is regularly moved around are some examples. These environments will benefit from a real-time tracking of these secure objects and dynamic security level modification. This also leads to improved management of security resources and personnel, since actions can be prioritized based on high and low security level areas.

While preferred embodiments of the present invention have been described using specific terms, such description is for illustrative purposes only, and it is to be understood that changes and variations may be made without departing from the spirit or scope of the following claims.

What is claimed is:

1. A system for dynamically providing security measures for a secure area, the system comprising:

a sensitivity index assigned to each of a plurality of secure objects within the secure area;

a scanner within the secure area for detecting the sensitivity index of each of the plurality of secure objects within the secure area;

a first logic unit in communication with the scanner for determining a security level for the secure area, said security level being a function of the sensitivity indices of the plurality of secure objects within the secure area; and at least one security monitor monitoring the secure area, wherein, based on the security level for the secure area, the at least one security monitor alters at least one of surveillance parameters of the secure area or access parameters to the secure area.

2. The system of claim 1, further comprising:

an indicator coupled to each of the plurality of secure objects, said indicator being scannable by the scanner and being associated with the sensitivity index for said each of the plurality of secure objects.

3. The system of claim 2, wherein the indicator further comprises the sensitivity index of a secure object.

4. The system of claim 2, further comprising:

a first database coupled to the first logic unit, the database containing a record for each of the plurality of secure objects, the record further including the sensitivity index for each secure object.

5. The system of claim 4, wherein the indicator comprises a unique ID for the secure object; and wherein the first logic unit receives the unique ID from the scanner and retrieves the record corresponding to the secure object to determine the sensitivity index of the secure object.

6. The system of claim 2, wherein the scanner is a radiofrequency, optical, or magnetic scanner.

7. The system of claim 6, wherein the indicator is an RFID tag, barcode, or magnetic strip.

8. The system of claim 1, further comprising:

a plurality of security parameters stored on a second database, wherein each security parameter corresponds to a security level of the secure area.

9. The system of claim 8, further comprising:

a second logic unit coupled to the second database, wherein the second logic unit activates a security parameter corresponding to the security level of the secure area, both second logic unit and second database being coupled to the first logic unit.

10. The system of claim 9, wherein the second logic unit is a part of a central monitoring station.

11. The system of claim 9, wherein the plurality of security parameters further comprises any combination of the following parameters: access, surveillance, and system resources.

12. A method for dynamically providing security measures for a secure area, the method comprising:

detecting a plurality of secure objects within the secure area, each secure object having a sensitivity index;

determining a security level for the secure area, said security level being a function of the sensitivity indices of the plurality of secure objects within the secure area; and altering at least one of surveillance parameters of the secure area or access parameters to the secure area based on the security level of the secure area.

13. The method of claim 12, further comprising:

retrieving the sensitivity index of each of the plurality of secure objects from an indicator coupled to each secure object, said indicator being scannable by the scanner and being associated with the sensitivity index for said each secure object.

14. The method of claim 13, further comprising:

retrieving the sensitivity index of a secure object directly from the indicator.

15. The method of claim 13, further comprising:

scanning the indicator coupled to a secure object; and referring to a first database coupled to the first logic unit to retrieve a record for the secure object, the record further including the sensitivity index for the secure object.

16. The method of claim 13, wherein the scanner is a radiofrequency, optical, or magnetic scanner, and wherein the indicator is respectively a RFID tag, barcode, or magnetic strip.

17. The method of claim 12, further comprising:

communicating the security level for the secure area to a second logic unit; and activating a plurality of security parameters for the secure area corresponding to the security level for the secure area.

18. The method of claim 17, further comprising:

referring to a second database containing records for each secure area, the records comprising security parameters corresponding to each security level for said each security area.

19. The method of claim 17, wherein the security parameters further comprise any combination of the following parameters: access, surveillance, and system resources.

20. The method of claim 12, wherein the security level for the secure area is updated in real time.

* * * * *